Dec. 22, 1953 R. T. ANDERSON 2,663,623
COUNTER-CURRENT EXTRACTION APPARATUS
Filed Oct. 4, 1950 4 Sheets-Sheet 1

INVENTOR.
RAYMOND T. ANDERSON
BY
Hyde, Meyer, Baldwin & Doran
ATTORNEYS

Dec. 22, 1953  R. T. ANDERSON  2,663,623
COUNTER-CURRENT EXTRACTION APPARATUS
Filed Oct. 4, 1950  4 Sheets-Sheet 2
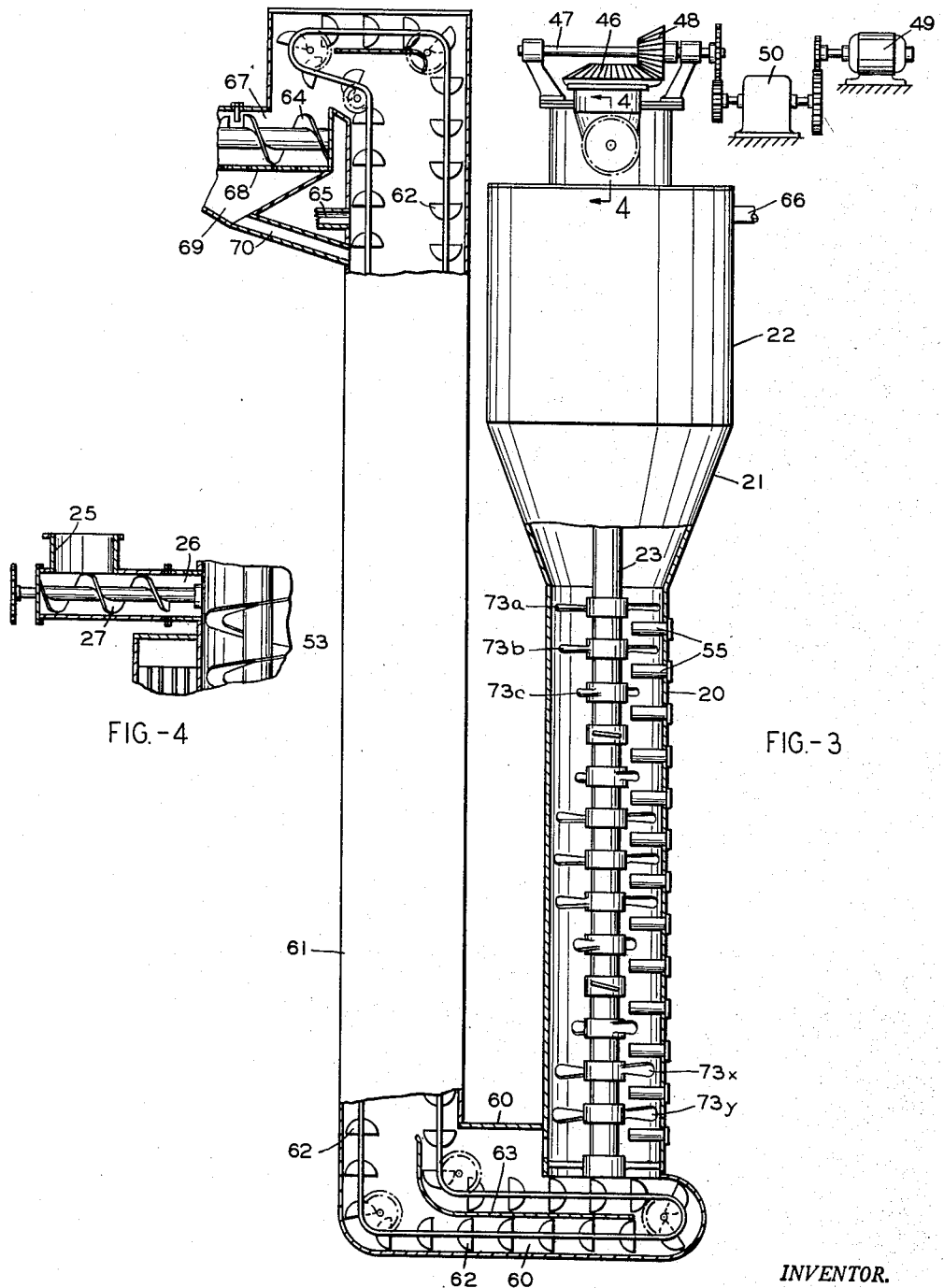
INVENTOR.
RAYMOND T. ANDERSON
BY
Hyde, Meyer, Baldwin & Doran
ATTORNEYS Dec. 22, 1953

R. T. ANDERSON 2,663,623

COUNTER-CURRENT EXTRACTION APPARATUS

Filed Oct. 4, 1950

INVENTOR.
RAYMOND T. ANDERSON
BY
*Hyde, Meyer, Baldwin & Doran*
ATTORNEYS

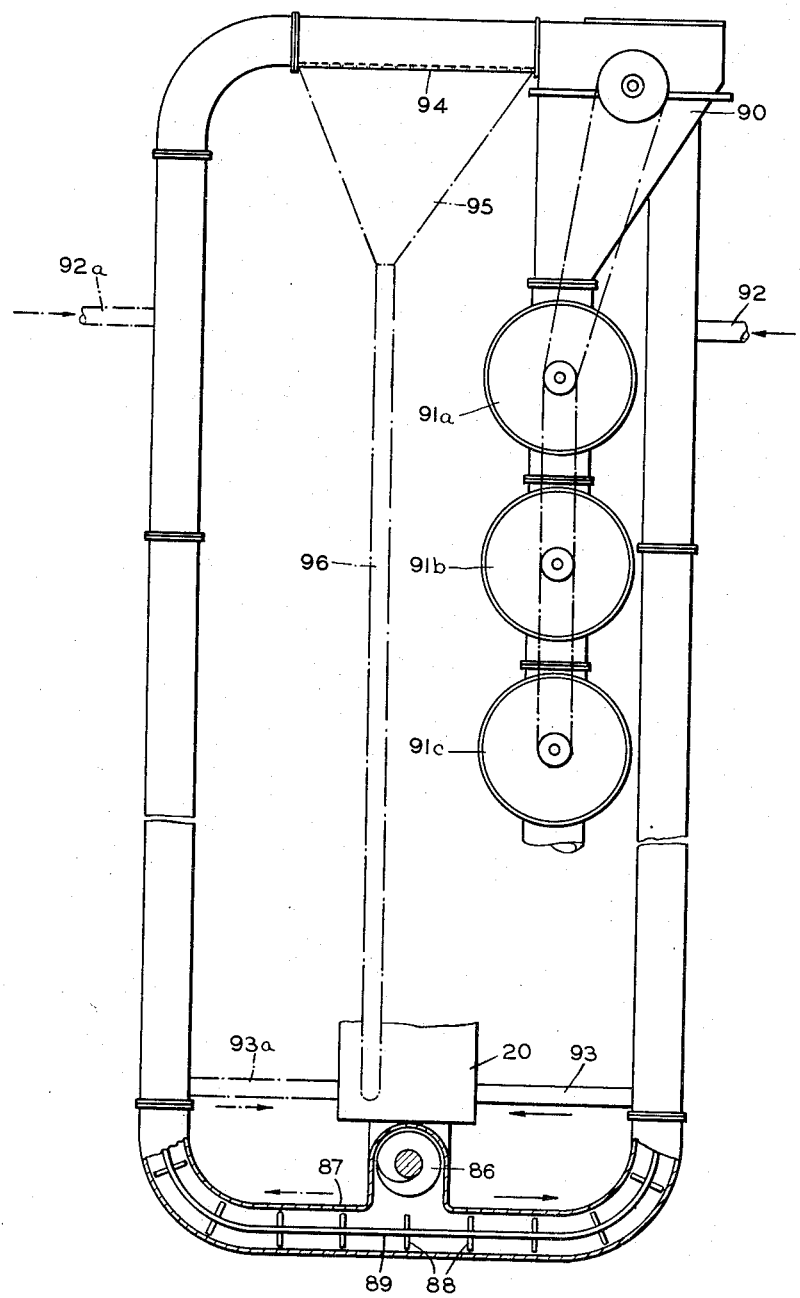

Patented Dec. 22, 1953

2,663,623

UNITED STATES PATENT OFFICE 2,663,623

COUNTER-CURRENT EXTRACTION APPARATUS

Raymond T. Anderson, Lakewood, Ohio, assignor to The V. D. Anderson Company, Cleveland, Ohio, a corporation of Ohio Application October 4, 1950, Serial No. 188,472

10 Claims. (Cl. 23—270)

The invention relates to extraction towers such as are used for solvent extraction of oil from seeds or other oil bearing organic materials.

The invention more particularly relates to, and has for its object, the provision of novel and improved means for controlling the passage of the oil bearing material through the solvent liquid, in counterflow relation thereto, whereby a more efficient oil extraction is achieved.

As is known to those skilled in the art of solvent extraction of vegetable oils or the like, it is desirable that the oil bearing material be maintained in intimate contact with the solvent for as long a period as possible consistent with economic production considerations so that the residual oil remaining in the material at the conclusion of the solvent step may be reduced to a desired minimum value. Means are already known for delaying the progress of the material through the solvent. Such means in one well known embodiment comprises a tall cylindrical extraction tower having a plurality of vertically spaced partitions or shelves of disc-like form, each shelf being centrally perforated to receive a vertical, rotatable shaft. The shaft carries a like plurality of blades or sweeps, each sweep disposed to depend practically into contact with a respective upper surface of a shelf. Each shelf is provided with an off-center opening, the openings in the various shelves being staggered, that is to say being out of vertical alignment. Solvent liquid is introduced to the tower below the bottom shelf, and is allowed to overflow to removal means above the top shelf. The oil bearing material is introduced above the top shelf, and drops by gravity through the solvent liquid. As it settles on each shelf, the respective sweep impels the material along the shelf and through the off-center aperture whence it falls to the next lower shelf, and this cycle is repeated for each shelf until the material reaches the lower end of the tower. At this time it presumably has given up most of its oil to the up-flowing solvent. The solid material is removed from the tower bottom by suitable means.

In other and possibly less efficient methods the solvent is allowed to percolate through bags or perforated containers full of oil-bearing material or to flow over endless conveyors on which the material is being advanced.

Obviously, the most desirable situation requires thorough leaching contact with each seed, or flake, or particle of the oil bearing material, while the material is moving through the extraction tower, although such thorough contact is not achieved when batches or layers or beds of the material have an appreciable depth through which the solvent must penetrate.

In view of the deficiencies of known apparatus and processes I have devised means for accomplishing the end desired, namely to permit ready access of the solvent to each discrete oil-bearing particle.

Referring now to the drawings which accompany this specification,

Fig. 3 is a view, partly in side elevation and partly in sectional elevation, showing a somewhat modified embodiment of the invention.

Fig. 4 is a sectional view taken on the line 4—4 of Fig. 3.

Fig. 7 is a view, partly in elevation, partly in section, showing my invention as used in conjunction with yet another material removal unit.

Figures 1, 2:
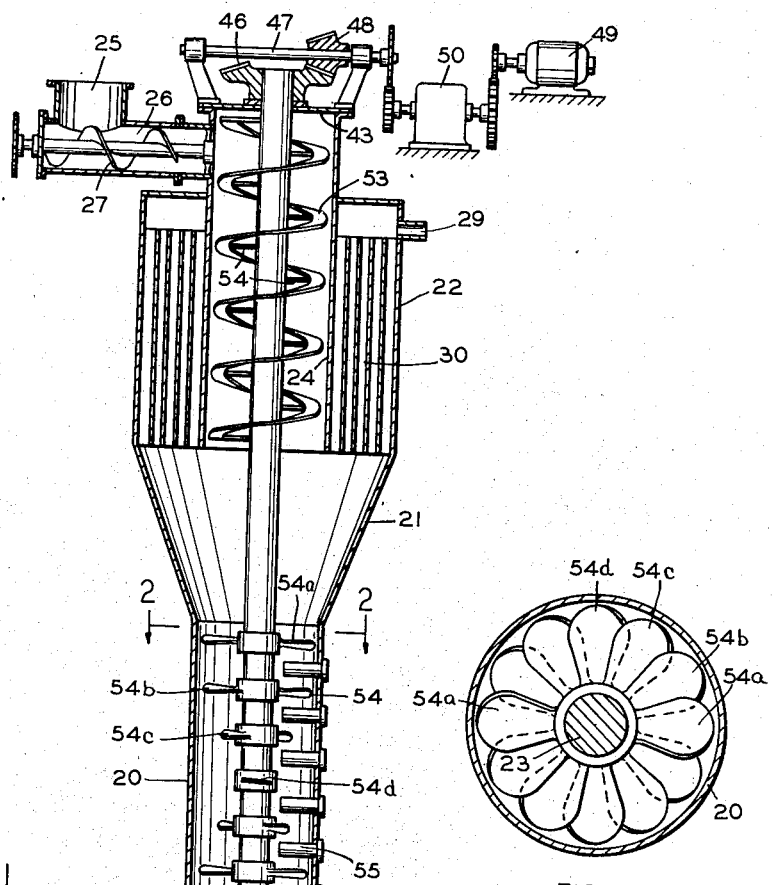
Fig. 1 is a vertical sectional view through an extraction tower equipped to fulfill the ends of the present invention. The showing is somewhat schematic, refinements of mechanical detail being omitted, since the construction will be readily understandable in conjunction with the description hereinbelow.
Fig. 2 is a sectional view taken on the line 2—2 of Fig. 1, and somewhat enlarged.

Referring first to Figs. 1 and 2, there is shown an extraction tower 20 of cylindrical character. Above the portion 20 the tower flares outwardly conically at 21, and at the top is a fines-separating cylindrical portion 22. A rotatable shaft 23 extends downwardly through a central tubular passage 24 in the fines separator, and continues down into and through the portions 21 and 20. Solid oil bearing material is fed into a receiving chute 25, and advanced through a feed passage 26 by a feed screw 27, being thereby introduced to tubular passage 24. The flaked material, in conjunction with the feed screw 27 and the passage wall, constitutes a flake seal so as to retain the solvent vapors in the column. The screw 27 stops somewhat short of the passage wall 24, leaving a space between the screw and the wall for the formation of a plug seal.

The solvent liquid is introduced at the bottom of tower 20 through an inlet conduit 28, and it flows upwardly to the tower whence it is discharged through a conduit 29. The annular chamber portion 30 is a fines-settling chamber wherein fine solid particles in suspension in the liquid can settle backwardly and downwardly since progress of the liquid through the many tubular passages of the settling chamber is somewhat delayed. The structure of the settling chamber forms no part of the present invention, and will not be more specifically described herein.

The solid material settling through the tower portions 24, 21, 20 is removed at the bottom through a discharge passage 33 by means of a discharge screw. The discharge screw preferably comprises a plurality of individual screw flights 34a, 34b, 34c, spaced along the screw shaft 34. I have provided stop screws 31 extending inwardly from the passage wall, between screw flights, to prevent the material from merely rotating with the flights and shaft without progressing towards the discharge end. Liquid escape at the bottom is prevented by a choke plug 35 biased to closed position by a counterweight 36 at the end of a leverage system 37. The discharge screw 34 is driven by means of a motor 38, through a variable speed gear reduction system 39 and sprockets 40, with roller chain drive controllable as desired by the operator. The solid material is continuously firmly compacted against plug 35, and escapes around the annular clearance space 43 surrounding the plug periphery. Entrained liquid in the compacted solid is thereby considerably reduced.

The vertical shaft 23 hereinabove mentioned is rotatably suspended from a roof plate 43 which covers the top of the tubular passage wall 24. Conventional bearings and other usual elements familiar to those skilled in the art are omitted. The bottom end of shaft 23 rests in a bearing 44 supported on a spider 45. Pinned to the top of the shaft 23 is a bevel gear 46. A cross shaft 47 has a bevel pinion 48 pinned thereto in mesh with gear 46. Shaft 47 is driven from motor 49 through a speed reduction gearing 50, and preferably the output speed can be adjusted at the will of the operator. The reduction is such that the shaft 23 rotates at extremely low speed, for example from one-tenth to twenty revolutions per minute.

The oil-bearing material is usually reduced to thin flakes in a flaking mill, and after introduction to a chute or hopper 25 it is moved through the tubular passage 24 by screw 27. The liquid level is established by the solvent discharge conduit 29, and to prevent the flakes from piling up at the surface of the solvent a helical ribbon conveyor 53, attached by spokes 54 to shaft 23 so as to rotate therewith, carries the flakes beneath the solvent surface. As they begin to absorb solvent, the flakes settle by gravity, assisted by the ribbon conveyor, and the solvent begins to leach oil out of the flakes.

Within the cylindrical portion 20 of the extraction tower the shaft 23 is provided with a spaced plurality of paddles 54a, 54b, etc., fixed to the shaft. As shown the paddles are of propeller type but with very little pitch, and are so oriented with respect to the direction of shaft rotation that they offer a mild opposing force to the downward gravitational force effective on the flakes. Simply speaking, the purpose of the paddles is to prevent the flakes from falling too fast, consistent with production requirements. The process, of course, is a continuous one, and the speed of the paddles is selected in conformity with the amount of material to be charged and discharged, and the desired period of contact between the ascending solvent and the descending flakes.

As apparent from Figs. 1 and 2, the paddles are about evenly spaced, vertically, and are vertically staggered, to prevent any tendency to a straight vertical drop of the material.

A vertical series of stop blades 55 alternates with the paddles, to prevent circular travel of the flakes, since, obviously, general downward progression of the material is necessary. The stop blades may be unscrewed and withdrawn through the cylindrical wall of the tower. When so withdrawn (of course after drainage of all liquid) the shaft and paddles may be lifted upwardly as a unit for cleaning, alteration, or otherwise.

By means of the apparatus just described the flakes are held in slowly dropping suspension in the solvent so that the solvent can effectively reach all surfaces of the flakes. This effect cannot be achieved when the oil bearing material settles on shelves, or is held in bags or baskets. The tower parts 20, 21 and 22 can be assembled by welding, since the shaft can be inserted or removed as a unit. Gasketed joints are thereby eliminated.

The paddles may be of even greater effective intercepting area than those shown in Fig. 2, and have even less pitch, so that, should a power failure occur, a major proportion of the descending flakes will settle on the paddles and there will be no undesirable pile-up at the bottom of the tower.

I have found that with the apparatus just described there is an improved oil yield in a shorter period of time as compared with previous apparatus and processes. The tower can be built at a lower cost because of the welded construction. A one piece shaft also provides a stronger structure.

While occasional reference has been made hereinabove to the oil bearing material as being of flake form, it will of course be obvious that the oil bearing particles can be of other shapes without altering the character of the invention in any respect, so long as the particles have enough effective area to encounter some resistance to their downward progression. It is further obvious that if the oil bearing material is of lower specific gravity than the selected solvent, so that the solid material tends to rise in the solvent, the essential elements comprising this invention may be reversely oriented, that is to say the solvent can be caused to flow downwardly, counter to the direction of travel of the oil bearing material, and the pitch and/or direction of rotation of the paddles may be reversed to produce a counter force downwardly opposing the tendency of the material to rise.

Fig. 3 shows a somewhat modified embodiment of my invention. In this embodiment the structure of the tower including the parts 20, 21 and 22 remains the same as well as the drive means for the shaft. The solid removal means is somewhat modified. The lower end of the tower chamber communicates with the space within a bay 60 of a casing 61 which stands upright beside the tower. In the casing and bay there travels a power driven endless bucket elevator conventionally shown at 62, the buckets of which are perforated. The elevator runs slowing, to permit the liquid carried up in the rising portion of the conveyor above the liquid level to drain through the perforations. The buckets move over a horizontal shelf 63 below the tower portion 20, on which shelf the flakes or other material settles. Thus the buckets serve as scrapers to sweep along the solid material on shelf 63, fill themselves with the material, and carry it up through a solvent column in casing 61. The material thus elevated and drained is dropped into discharge screw means 64. In this embodiment fresh solvent is introduced at inlet pipe 65 near the top of the casing 61 so that it proceeds downwardly through the casing and upwardly through the tower, being discharged through pipe 66. In this way fresh solvent can percolate downwardly through the ascending buckets 62 and effect an additional leaching of residual oil. The bottom 68 of the material discharge passage 67 is perforated to permit drainage from the discharged material through a trough 69 and conduit 70, back to the casing. The leached material may be routed by screw 64 to a press where excess miscella is squeezed out and returned, for example, to drainage hopper 69 where it will augment the fresh hexane entering at 65.

As may be supposed, as the solvent picks up more and more oil, and flows towards the upper end of tower portion 20, it becomes more viscous, and therefore in said upper end the oil bearing material encounters greater resistance to downward travel. In this embodiment I show an arrangement wherein the paddles near the top, for example 73a, 73b, 73c, etc., are of lesser pitch than the paddles 73x, 73y, etc., near the bottom, and indeed the pitch may vary progressively all the way from top to bottom, just as does the viscosity of the miscella.

The paddle arrangement shown in Fig. 3 may be substituted for that shown in Fig. 1, or the solid removal means of Fig. 3 may be substituted for that shown in Fig. 1. It will be obvious that although the paddles are shown as being of the two-bladed type, one, three or more blades could be used, and the pitch or R. P. M. may be varied to accommodate varying conditions such as the viscosity of the solvent, the varying weights of different materials, the speed of descent of the solid material, the desired period of immersion of the material, and other factors familiar to those skilled in the art. In normal operation it is most convenient to vary the R. P. M. while keeping the pitch constant, especially when operating on various materials.

As indicated by the sectional view, Fig. 4, the flake-seal intake comprises the chute 25, passage 26, and feed screw 27, as previously described in connection with Fig. 1.

Figure 6:
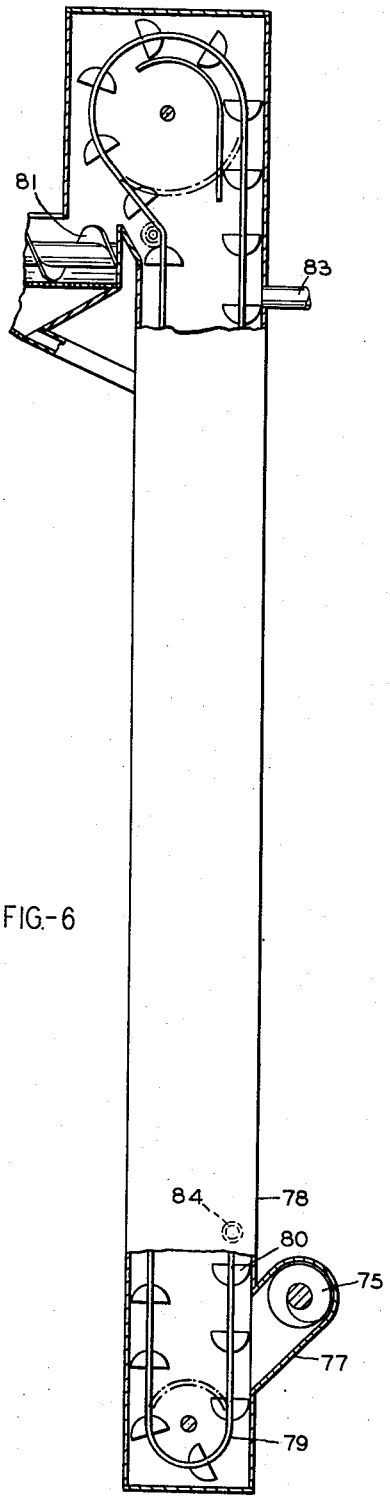
Fig. 6 is a view, partly in section, partly in side elevation, taken on the line 6—6 of Fig. 5.
Figure 5:
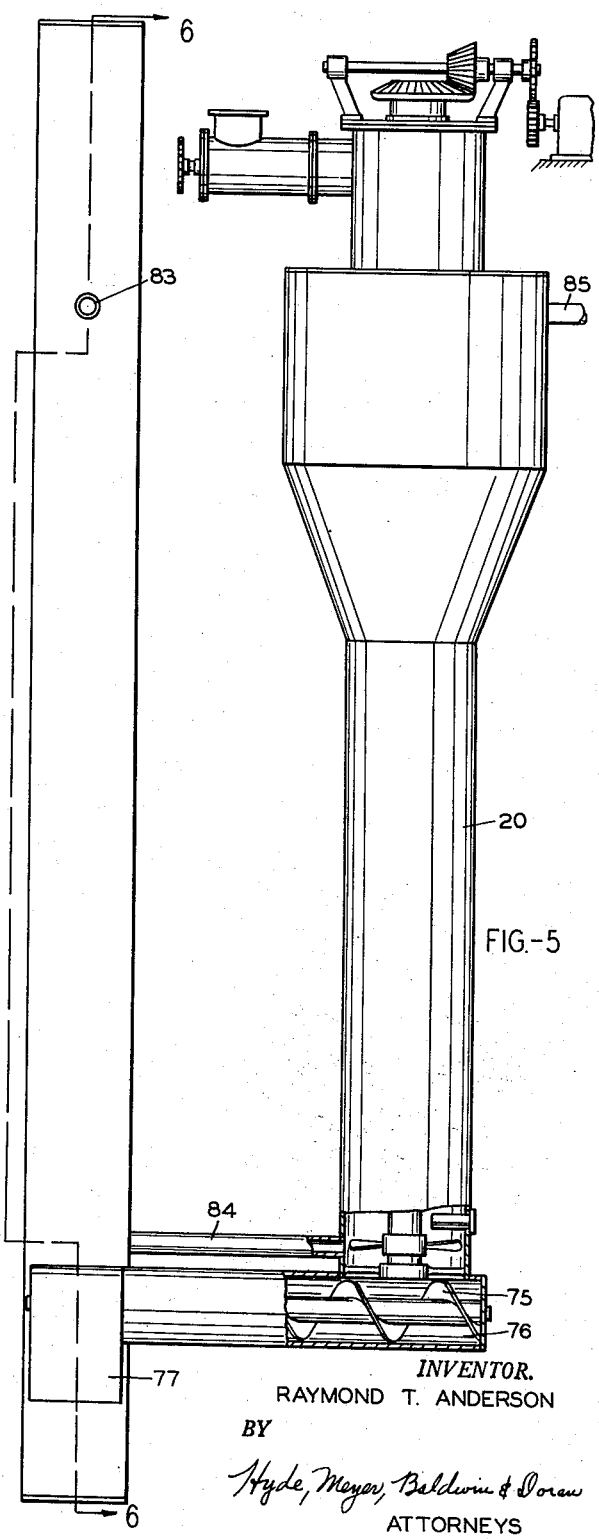
Fig. 5 is a view, mainly in elevation, but with parts broken away and in section, showing my invention as used in conjunction with a somewhat modified material removal unit.

Figs. 5 and 6 show an embodiment in which the solid material is conveyed from the bottom of tower 20 by a discharge screw 75 in a tubular chamber 76. The screw discharges the material to a chute 77, whence it enters the lower end of an elevator housing 78 in which is movably mounted a slowly moving endless conveyor chain 79. The chain is provided with perforated buckets 80 which pick up the material entering from chute 77 and carry it upwardly in the right hand side (Fig. 6) of the elevator. At the top of the elevator the chain and buckets swing counterclockwise and dump the material into a discharge screw 81, the construction of the screw and associated structure being similar to the discharge and drainage means in the upper left portion of Fig. 3, and already described.

Commenting further on Figs. 5 and 6, there is shown inlet means 83 for fresh solvent liquid which travels through the elevator in counter flow relationship to the solid material, proceeds through communicating means such as the pipe 84, and ascends through the tower 20 to the discharge pipe 85. The pipe, or similar liquid flow passage, facilitates travel of the solvent liquid, although liquid can also percolate through material being advanced through passage 76 since the passage has no biased choke plug to load the screw. Such loading, which prevents free liquid escape with the solid, is here unnecessary because there is liquid in the elevator as above described.

Fig. 7 shows still another embodiment in which solid material from the bottom of tower 20 is discharged by screw 86 to the lower end of a slowly moving endless conveyor elevator means 87 whence it is carried counterclockwise by perforated vanes 88 on chain belt 89 and directed into a hopper 90. From the hopper the material drops into and is advanced through a plurality of successive drying containers 91a, 91b, 91c, only three being here shown although more may be provided. The outlet of the dryers has a rotary valve of conventional design to retain the vapors within the dryers but which lets out the desolventized meal to atmosphere into a conveyor, which conveys the meal to a toaster or to storage for shipment.

The steam jackets on the dryers heat the meal in said dryers and drive off substantially all liquids in vapor form. These vapors rise to the top of the dryers and leave through vents, eventually going to condensers, where they are reclaimed as liquids and are again used to leach out more oil from incoming flakes. The dried meal is stored or packed for shipment. In this embodiment also, fresh solvent enters at 92 and crosses to the tower 20 through pipe 93 or past the screw 86 as previously described in connection with Figs. 5 and 6. The travel of solid material counterclockwise and solvent counterclockwise is indicated by full line arrows in Fig. 7.

The apparatus shown in Fig. 7 permits an alternative method including a reversal of the conveyor chain belt 89 with the following effect. The solid material delivered by screw 86 now is carried clockwise and the solvent counterclockwise as indicated by the dot dash arrows. The fresh solvent esters at 92a, travels downwardly in counterflow relation to the solids, and crosses to the tower through pipe 93a. The solid drains after rising above the liquid level established by pipe 92a, and, before entering hopper 90, it is moved across a perforated wall 94, so that any excess liquid drains into a collecting cone 95, and through a pipe 96 back to the lower end of tower 20.

What I claim is:

1. Apparatus for solvent extraction of the oil content of oil bearing material comprising an upright chamber, means for introducing solvent liquid near one end of said chamber, and for discharging it near the other end of said chamber, means for introducing said material to said chamber, said material being of specific gravity such that it moves through said solvent liquid in a direction counter to the direction flow of said solvent liquid, a rotatable shaft disposed substantially vertically in said chamber and blade means having a planar portion, said blade means being carried by and extending radially from said shaft, and below the surface of said solvent liquid, the planar portion of said blade means being so inclined to the horizontal as to oppose and retard downward material movement when said shaft is rotated in one direction, whereby to maintain the particles in suspension during an adequately long leaching period.

2. Apparatus as defined in claim 1, and comprising, in combination therewith, helical conveyor means on said shaft, and fixed to rotate therewith, there being a portion of said conveyor means above the surface of said solvent liquid, and another portion below the surface of said solvent liquid, said helical conveyor means being so oriented with respect to rotation of said shaft as to cause said oil bearing material to be immersed beneath said surface when said shaft is rotating.

3. Apparatus as defined in claim 2 wherein said helical conveyor means consists of a helically inclined continuous ribbon spaced from said shaft, and supporting means for said ribbon fixed to said shaft and extending outwardly therefrom and fixed to said ribbon.

4. Apparatus for solvent extraction of the oil content of oil bearing material comprising an upright chamber, means for introducing solvent liquid to said chamber near its lower end, means for discharging liquid from said chamber near its upper end whereby to establish an upper level of the liquid surface near said upper end of said chamber, means for admitting particles of said oil bearing material to said upper end of said chamber whereby said particles drop by gravity into said solvent liquid and downwardly therethrough, a rotatable shaft disposed substantially vertically in said chamber and blade means having a planar portion, said blade means being carried by and extending radially from said shaft, and below the surface of said solvent liquid, the planar portion of said blade means being so inclined to the horizontal as to oppose and retard downward material movement when said shaft is rotated in one direction, whereby to maintain the particles in suspension during an adequately long leaching period.

5. Apparatus for solvent extraction of the oil content of oil bearing material comprising an upright chamber, means for introducing solvent liquid to said chamber near its lower end, means for discharging liquid from said chamber near its upper end whereby to establish an upper level of the liquid surface near said upper end of said chamber, means for admitting particles of said oil bearing material to said upper end of said chamber whereby said particles drop by gravity into said solvent liquid and downwardly therethrough, a rotatable shaft disposed substantially vertically in said chamber, and a plurality of vertically spaced blades fixed along said shaft, each said blade having a planar portion inclined to the horizontal below the surface of said liquid, the inclination being such that it opposes and retards downward material movement when said shaft is rotated in one direction, whereby to maintain the particles in suspension during an adequately long leaching period.

6. Apparatus as defined in claim 5 wherein the pitch inclination of said paddles varies progressively from one end of said shaft to the other end of said shaft.

7. Apparatus as defined in claim 5 wherein the pitch of the paddles nearer the solvent introduction end of said chamber differs from the pitch of the paddles near the liquid discharge end of said chamber.

8. Apparatus as defined in claim 5 wherein the chamber wall is provided with removably fixed baffle means extending inwardly between adjacent paddles for the purpose of preventing non-progressive rotational movement of the liquid and the particles in suspension therein.

9. Apparatus as defined in claim 5 wherein the paddles are progressively staggered so that adjacent paddles are out of mutual vertical registry.

10. Apparatus for solvent extraction of the oil content of oil bearing material comprising an upright chamber, an upright elevator conduit at one side of the chamber, passage means for permitting solid and liquid transfer between said chamber and said conduit near the respective lower ends thereof, means for introducing solvent liquid near the upper end of said conduit, and for discharging it near the upper end of said chamber, means for admitting particles of said oil bearing material to the upper end of said chamber whereby said particles drop by gravity into said solvent liquid and downwardly in counter current relation thereto, a rotatable shaft disposed substantially vertically in said chamber, and blade means having a planar portion, said blade means being carried by, and extending radially from, said shaft, and below the surface of said solvent liquid, the planar portion of said blade means being so inclined to the horizontal as to oppose and retard downward material movement when said shaft is rotated in one direction, whereby to maintain the particles in suspension during an adequately long leaching period, means for continuously transferring solid material through said passage means to said conduit, a continuously operating conveyor means in said conduit provided with a series of material carriers, and adapted to receive solid material transferred through said passage as aforesaid, and elevate said solid material through and above the level of liquid in said conduit.

RAYMOND T. ANDERSON.

References Cited in the file of this patent

UNITED STATES PATENTS

| Number | Name | Date |
|---|---|---|
| 2,154,339 | Lawrence | Apr. 11, 1939 |
| 2,156,236 | Bonotto | Apr. 25, 1939 |
| 2,184,248 | Bonotto | Dec. 19, 1939 |
| 2,187,890 | Pattee | Jan. 23, 1940 |
| 2,203,666 | Bonotto | June 11, 1940 |
| 2,276,298 | Frazier | Mar. 17, 1942 |
| 2,545,938 | Bilbe | Mar. 20, 1951 |
| 2,550,947 | Straight | May 1, 1951 |
| 2,551,820 | Woody et al. | May 8, 1951 |